United States Patent [19]

O'Donnell

[11] Patent Number: 4,613,862
[45] Date of Patent: Sep. 23, 1986

[54] ADAPTIVE MUTUAL INTERFERENCE SUPPRESSION METHOD

[75] Inventor: Bernard N. O'Donnell, Ellicott City, Md.

[73] Assignee: The United States of America as represented by the Secretary of the Air Force, Washington, D.C.

[21] Appl. No.: 624,568

[22] Filed: Jun. 26, 1984

[51] Int. Cl.⁴ .............................................. G01S 7/66
[52] U.S. Cl. ............................................ 343/17.1 PF
[58] Field of Search ........................... 343/17.1 R, 5 R

[56] References Cited

U.S. PATENT DOCUMENTS

| 3,095,541 | 6/1963 | Ashcraft | 328/115 |
| 3,258,769 | 6/1966 | Forestier | 343/7.5 |
| 3,381,292 | 4/1968 | Hansen | 343/17.5 |
| 3,731,310 | 5/1973 | Rittenbach | 343/17.1 R |
| 3,803,604 | 4/1974 | Case | 343/7.3 |
| 3,911,432 | 10/1975 | Williams | 343/5 R |
| 3,938,149 | 2/1976 | Grantham | 343/17.1 R |
| 4,010,468 | 3/1977 | Fishbein et al. | 343/5 R |
| 4,143,373 | 3/1979 | Chernick | 343/17.1 PF |

OTHER PUBLICATIONS

K. H. Chase and J. L. Pierzga, Reducing Mutual Radar Interference, Electronics, Jul. 10, 1959, pp. 39–43.

Primary Examiner—Thomas H. Tarcza
Assistant Examiner—Donald E. Hayes, Jr.
Attorney, Agent, or Firm—Donald J. Singer; Richard J. Donahue

[57] ABSTRACT

A method is described which provides automatic self synchronization (in time) between multiple pulse repetition frequency (PRF), pulse doppler radars. The synchronization technique time aligns data within a coherent look transmission (a group of pulses—typically milliseconds). This technique substantially eliminates sensitivity losses associated with blanking false alarms or detection from interfering radars transmitting (in time) at pulse repetition intervals (PRI) different than the host radar. An implementation of this method for a 2 PRF radar waveform is described although the technique may be extended to more than 2 PRF's. The technique provides an alternative approach to pulse shaping or multiple (different) frequencies to control MI but may be used in conjunction with these techniques to minimize sensitivity losses due to interference blanking. For applications where wide angular antenna beams are required and/or multiple simultaneous radar operation is required (e.g., airborne close aircraft formations or closely spaced ground warning radars), this technique is especially useful for MI control. This is especially true for a defensive radar system such as an active missile warning radar.

1 Claim, 13 Drawing Figures

| TIME (SEC.) | 0 | .25 | .50 | .75 | 1.0 | 1.25 | 1.50 |
|---|---|---|---|---|---|---|---|
| SLICE NO. | 1 | 2 | 3 | 4 | 5 | 6 | |
| (2 ANTENNA) L, R SLICE | L | R | L | R | L | R | |
| PRF/MI FUNCTIONS | | | | | | | |
| REF. SLICE (MI MEAS) | | | | ★L | | ★R | |
| PRF RE-TIMED SLICES | ★ | ★ | | ★ | ★ | | |
| MI DETECTION / NEXT REF. SLICE RE-TIMING DECISION | ★L | ★ | | ★R | ★ | | |

FIG. 1A

| TIME (SEC.) | 0 | .25 | .50 | .75 | 1.0 | 1.25 | 1.50 |
|---|---|---|---|---|---|---|---|
| SLICE NO. | 1 | 2 | 3 | 4 | 5 | 6 | |
| PRF/MI FUNCTIONS | | | | | | | |
| REF. SLICE (MI MEAS) | | | ★ | | | ★ | |
| PRF RE-TIMED SLICES | ★ | ★ | | ★ | ★ | | |
| MI DETECTION / NEXT REF. SLICE RE-TIMING DECISION | ★ | ★ | | ★ | ★ | | |

FIG. 1B

REFERENCE SLICE (3,6) MEASUREMENT

|  | N≤1 | 2≤N≤8 | N≥9 |
|---|---|---|---|
| MI DETECTION SLICE (1,4) MEASUREMENT N≤1 | 1 | 3 | 3 (2*) |
| 2≤N≤8 | 3 | 3 | 3 (2*) |
| N≥9 | 2 | 2 | 2 |

N = TOTAL NO. OF LPRF LOOKS OF MI DETECTIONS

REFERENCE SLICE DECISION LEGEND:

1. PRF RANDOM 43 LOOK SEQUENCE SELECTED (NORMAL NO. MI CONDITION)

2. CONTINUE PRF RE-TIMING WITH INITIAL (1-43) PRF SELECTED SAME AS LOOK 86 OF PREVIOUS SLICE OR OPPOSITE OF PREVIOUS LOOK 86 IF MI RE-TIMED COUNT NOT REDUCED AFTER 3 SUCCESSIVE RE-TIMED SLICES

3. STOP PRF-RETIMING AND MAINTAIN SAME LOOK-PRF DISTRIBUTION AS PREVIOUS SLICE.

(2*) DECISION UNIQUE TO SINGLE ANTENNA IMPLEMENTATION

FIG. 2

|  |  | ADAPTIVE MI SUPPRESSION TIME (SEC.) | | |
|---|---|---|---|---|
| NO. OF PRF RE-TIMING CYCLES REQUIRED | 1 | .75 – 2.0 | .50 – .75 | .50 – .75 |
|  | 2 | 2.25 – 3.5 | 1.0 – 1.5 | 1.0 – 1.5 |
|  | 3 | 3.75 – 5.0 | 1.75 – 2.25 | 1.75 – 2.75 |
| MI LOCATION |  | LEFT MI | CENTER MI | NA |
|  |  | TWO ANTENNAS | | SINGLE ANTENNA |

FIG. 3

IF REF. SLICE USED TO MEAS. MI IS <u>A</u>, USE <u>TABLE 1</u>

| MI LOOK CENTROID = Nm | RE-TIMED LPRF LOOK NUMBERS | | RE-TIMED HPRF LOOK NUMBERS | |
|---|---|---|---|---|
| $0 \leq Nm \leq 22.0$ | Nm TO (Nm+42) | | 1 TO (Nm−1) | (Nm+43) TO 86 |
| Nm = 22.5 | 22 TO 64 | | 1 TO 21 | 65 TO 86 |
| $23 \leq Nm \leq 43$ | 1 TO (Nm−1) | (Nm+43) TO 86 | Nm TO (Nm+42) | |

Nm = MI LOOK CENTROID

<u>TABLE 1</u>

IF REF. SLICE USED TO MEAS. MI IS <u>B</u>, USE <u>TABLE 2</u>

| MI LOOK CENTROID = Nm | RE-TIMED LPRF LOOK NUMBERS | | RE-TIMED HPRF LOOK NUMBERS | |
|---|---|---|---|---|
| $43 \leq Nm \leq 65$ | 1 TO (Nm'−1) | (Nm'+43) TO 86 | Nm' TO (Nm'+42) | |
| Nm = 65.5 | 22 TO 64 | | 1 TO 21 | 65 TO 86 |
| $66 \leq Nm \leq 86$ | Nm' TO (Nm'+42) | | 1 TO (Nm'−1) | (Nm'+43) TO 86 |

Nm' = Nm − 43

<u>TABLE 2</u>

RETIMING ALGORITHM

1. STORE LOOK NUMBERS WHEN MI IS DETECTED DURING LPRF REFERENCE SLICE.

2. DETERMINE MI LOOK CENTROID BY SUMMING LOOK NUMBERS IN (1.) AND DIVIDE BY TOTAL NUMBER OF LOOKS IN WHICH MI IS DETECTED DURING LPRF REFERENCE SLICE. MI LOOK CENTROID = Nm

3. COMPUTE PRF-LOOK RE-TIMED DISTRIBUTION FOR NEXT 2 SLICES TO REDUCE NO. OF LOOKS CONTAINING MI. USE TABLES (1 OR 2) TO DETERMINE, RE-TIMED PRF DISTRIBUTION WITHIN THE 86 LOOK SLICES.

FIG. 5

UNIQUE FREQUENCY-RANGE DETECTION PATTERN (REL. TO NORMAL TARGET/CLUTTER) USED TO DETECT AND BLANK OPPOSITE PRF MI.

HPRF, LPRF INTEGER SUB-MULTIPLES OF CARRIER FREQUENCY AND PULSEWIDTH SELECTED AS SUB MULTIPLE OF INTER PULSE PEROIDS.

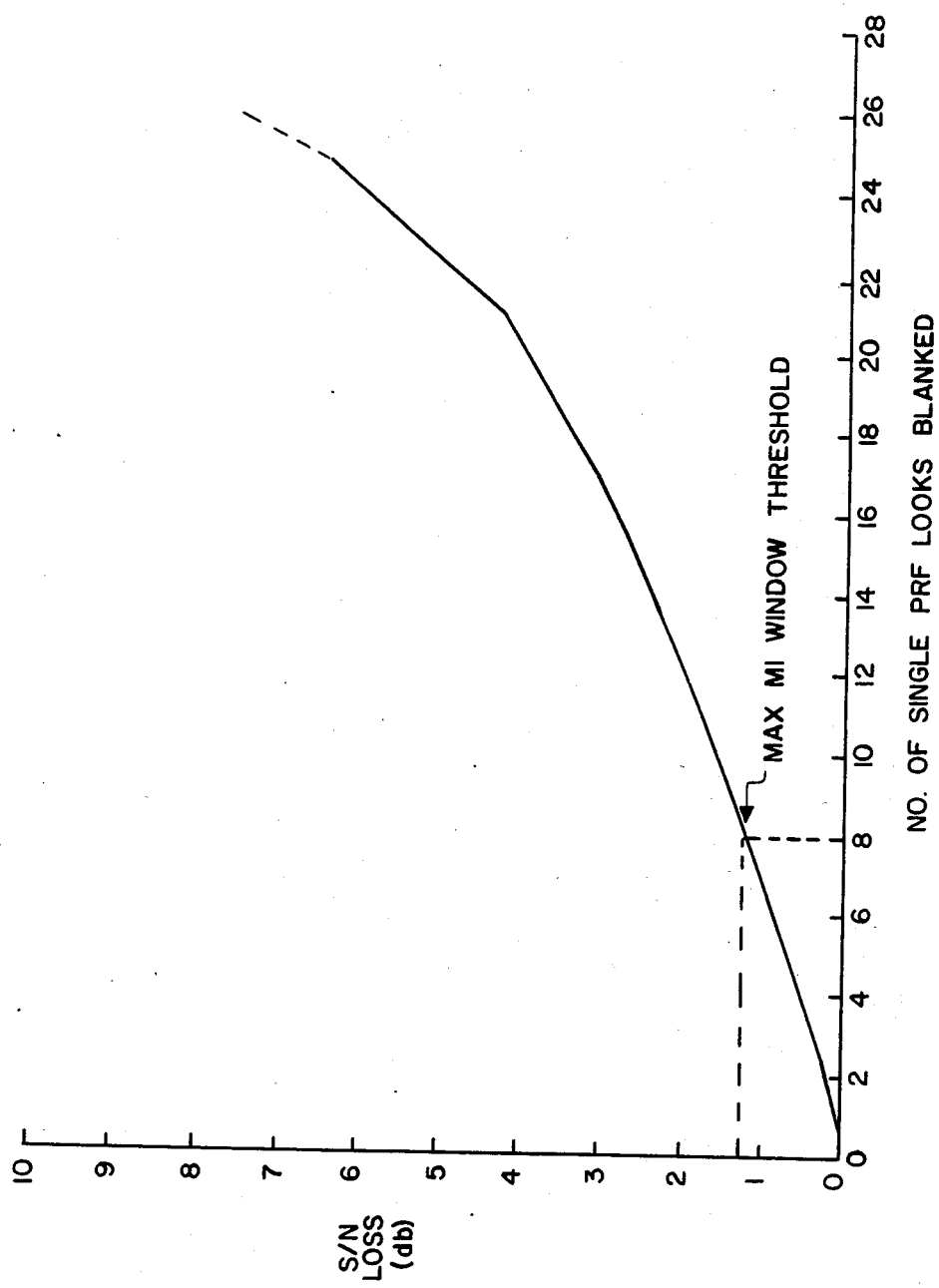

ADAPTIVE MUTUAL INTERFERENCE SUPPRESSION METHOD

STATEMENT OF GOVERNMENT INTEREST

The invention described herein may be manufactured and used by or for the Government for governmental purposes without the payment of any royalty thereon.

BACKGROUND OF THE INVENTION

The present invention concerns a method for suppressing mutual interference between two or more active radar systems operating in close proximity or formation.

Mutual interference (MI) between adjacent active defensive or offensive radar systems in military aircraft, can significantly affect the performance of each such radar system when both are emitting in a formation. The two major performance problems are false alarms and degraded system sensitivity. False alarms must be controlled by blanking to handle the worse case variable interference levels when the interfering radars are not operating at the same Pulse Repetition Frequency (PRF) and the signal levels exceed detection thresholds. Such interference levels vary with both separation range and frequency but the doppler MI frequency patterns can be uniquely recognized and detected. Digital blanking techniques which also detect opposite PRF MI have in fact been designed to blank such interference on a "coherent look basis," for the range gates and doppler filters affected by mutual interference.

The effect of mutual interference on system sensitivity, however, is a separate consideration. This is especially true for defensive missile warning radars requiring simultaneous operation over long time periods. While pulse shaping of the rise and fall time characteristics of the received radar reduces the sensitivity loss, this technique alone is not a practical solution for close formations with separations less than 0.5 NMI. However with the following adaptive MI suppression technique, the detection sensitivity loss will be minimized over the time intervals of opposite (or different for 3 or more PRF's) PRF blanking.

SUMMARY OF THE INVENTION

A unique digital method to combat the system sensitivity loss associated with such mutual interference is described herein. Although the invention is specifically described for a two pulse repetition frequency (PRF), pulse doppler (PD) missile warning defensive radar system, the concept can be extended to include three or more PRF radar systems. The method described herein does not depend on any pulse shaping capability or special data link and can be used for airborne or ground radar applications. All of the hardware changes required are in the digital data signal processing of such radar systems where the system pulse repetition frequency timing distribution is controlled. For the two PRF adaptive processing method described herein, the PRF's automatically adjust in time (to essentially the same time coincident PRF timing) so that the sensitivity loss due to opposite PRF blanking is minimized.

The proposed adaptive PRF/MI method utilizes the digital data signal processor in such a radar system to determine the PRF distribution over, for example, an 86 coherent look sequence or slice (assumed timing for application described). In this context the implementation is for a broad beam coverage, long integration time radar waveform. Each look might, for example, include a 64 pulse sequence for a radar system having 64 doppler filters. Since no special time phasing or synchronization between the conflicting radars is required, this technique works well independent of the number of interfering radars. The interference is controlled in time so as to maintain the interference within a tolerable level ($\leq 1$ dB S/N loss) in the filters affected by mutual interference while having no impact on system sensitivity in the majority of the filters. The MI data blanking hardware utilized in such radar systems for normally controlling MI false alarms is also utilized in the present invention to detect MI. This is necessary in order to determine the optimum PRF distribution within an 86 look "slice". For this implementation described, the PRF distribution is updated once every 0.75 sec (3 slices) in order to minimize the time required to achieve the CO-PRF (minimum interference) condition. This corresponds to more than one angular search volume frame for a 2 antenna configuration with each antenna processing a slice of data.

The PRF distribution is updated (or re-timed) until the number of looks containing MI is within a given small value so as to maintain the signal-to-noise loss for the filters containing MI to less than 1 dB. The time required for the radars to achieve this minimum sensitivity loss in this preferred embodiment of such a missile warning defensive radar system is a minimum of one slice or 0.25 seconds and a maximum of 5.0 seconds. During this time, the false alarms are controlled by the MI data blanker of the system. This MI control method will essentially eliminate the sensitivity loss due to mutual interference independent of the relative closing rate between the interfering radars in formation while still retaining the false alarm control during the process.

BRIEF DESCRIPTION OF THE DRAWINGS

FIGS. 1A and 1B are tables which depict the PRF/MI slice retiming cycle of the present invention;

FIG. 2 is a table which depicts the reference slice decision matrix of the present invention for the preferred embodiment;

FIG. 3 is a table which depicts the adaptive PRF/MI response times of the present invention for the preferred embodiment;

FIGS. 5 is a table which depicts the PRF retiming algorithms of the present invention for the preferred embodiment;

FIG. 9 is a graph of the signal to noise loss versus the looks blanked in the present invention for the preferred embodiment.

DESCRIPTION OF THE PREFERRED EMBODIMENT

Figure 4A:
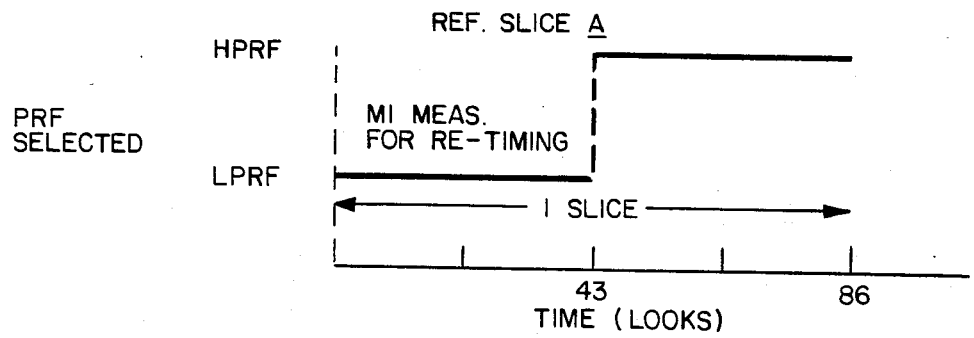
FIGS. 4A and 4B are graphs which show the reference slice PRF distributions of the present invention for the preferred embodiment.

There are three functions required to implement the method of the present invention:

(A) Reference slice timing and MI measurement;

(B) Determination of the interfering radar's PRF distribution and the required PRF redistribution algorithms; and (C) Determination of MI detection and PRF retiming update rate and CO-PRF interference blanking algorithm.

These will be described in separate sections below and referenced in the PRF/MI functional block diagram shown in FIG. 8 of the drawings.

A. Reference Slice Timing and MI Measurement

In the radar system implementation example, target detection and STAE (second time arrival echo) suppression is accomplished over an 86 look period or slice. A two PRF scheme is used to discriminate between FTAE (first time around echo) and STAE, (second time around echo) targets. One method of timing the 2 PRF sequence is to alternate the PRF transmitted every other look. For this case, there are 43 looks at a lower (LPRF) and alternating (every other look) 43 looks at a higher PRF (HPRF). These two PRF's will be described as the low and high PRF terminology in subsequent discussion. An alternate scheme of generating the PRF distribution is by transmitting the first 43 looks at one PRF and the last 43 looks at the other PRF which provides the same ranging discrimination for the targets of interest while providing a significantly better PRF distribution for MI measurement and retiming of the PRF distribution. This latter distribution has been selected as the reference slice herein for MI measurement and retiming determination.

In order to provide sufficient time to determine if the loss due to mutual interference blanking is sufficiently large to require PRF retiming, separate slices are dedicated only to MI detection (interference measurement). Thus, two 3 slice time intervals or a 6 slice time interval is required for a broad angular coverage radar system having a pair of wide beam antennas, such as might be employed on a large strategic bomber aircraft. This timing is required in order to assure that MI is adequately detected and appropriate PRF retiming accomplished independent of left, right, or center MI detection from various aircraft formations.

For an aircraft employing a single antenna (less radar angular coverage required) such as, for example, a fighter aircraft, a single 3 slice frame is used and thus, in general, the time required to detect and re-time the PRF distribution is about one-half of the time required for the bomber (2 antenna) on the average.

The functions of the 3 slice frame are illustrated for the bomber (two antenna) and fighter (one antenna) in FIGS. 1A and 1B respectively. For the bomber, the sequence consists for two 3 slice frames or a six slice sequence. During slices 1 and 2, the left and right slices are used to detect MI. Any previous slice will either be a re-timed slice with a special PRF distribution within the 86 looks or a reference slice used for measuring the MI distribution within the 86 looks. The reference slice consists of a slice in which the first 43 looks are either all low or high PRF while the last 43 looks operate on the opposite PRF from the first 43 looks. The selection of the PRF for the first 43 looks is either random (one look or less MI detected) or is the same as the previous slice 86 look PRF. In either case, the reference slice is used to determine the PRF distribution for the next 2 slices (minimum) which will initiate a closed loop sequence to minimize the number of looks containing MI.

FIGS. 1A and 1B show how the MI detection and reference slices are distributed within the one 6 slice sequence for the bomber and the two 3 slice sequences for the fighter. Since the decisions on the reference slice are dependent on the MI detections in the two previous slices, a reference slice decision matrix is shown in FIG. 2 to describe the choices for the reference slice. There are three possible conditions for decisions for the reference slice:

1. Reference slice when no MI detected:

PRF retiming search is initiated to detect MI for 2 radars with timing cycles within 1 look of each other. This reference slice measures MI and adjusts the PRF distribution for the next two slices. The first 43 looks are LPRF or HPRF based on random selection. This sequence will always be initiated on radar turn-on.

2. Reference slice during MI environment:

PRF retiming search is continued to adjust the MI to within a tolerable number of looks. The PRF distribution is determined for the next two slices. The first 43 looks are LPRF or HPRF based on look 86 of the previous slices (looks 1-43 are the same or opposite PRF as look 86 of the previous slice depending on the MI measurements over three re-timing cycles).

3. Reference slice during MI after PRF re-timing concluded:

There is the same PRF distribution as the previous re-timed slice. No further re-timing is required since MI is within the acceptable range.

In FIG. 2, the reference slice decisions requiring re-timing (1 and 2) are shown for the bomber and fighter. They could be the same but the fighter decisions shown (2*) minimize the time required to maintain the MI within the acceptable interference level window of 2-8 looks. In FIG. 3, the response times for the bomber and fighter digital adaptive MI processing technique are shown for various conditions. For the bomber, the MI angular location variation affects the time required in addition to the number of reference cycles required to reduce the maximum MI of 43 looks to less than 9. In general, the MI is reduced by a factor of 4 for each re-timing cycle. Thus the bomber adaptive MI processing could be completed within a maximum of 3.5 seconds while the fighter maximum time is 1.5 seconds for the same MI conditions. These times refer to the time required from initial MI detection to the completion of PRF re-timing and will occur only once when each radar is turned on in an MI environment. No additional PRF re-timing is required independent of relative closure rate of the MI radars.

B. Determination of PRF MI Distribution and Re-timing Algorithm

When MI is detected in more than an acceptable number of looks (eight has been initially selected as this upper threshold), the MI loss can be excessive in the filters affected. (Eight looks in each PRF). Thus, at this point, it is necessary to change the PRF distribution within the 86 looks of the slice to reduce the number of looks containing MI. This section describes the technique to accomplish this.

There are two distinct steps in altering the PRF distribution:

1. Measurement of MI with a reference slice PRF distribution to determine the looks containing MI with a known PRF distribution.

2. PRF retiming or determination of the required PRF distribution within the 86 looks which minimizes the number of looks containing MI.

Figure 4B:
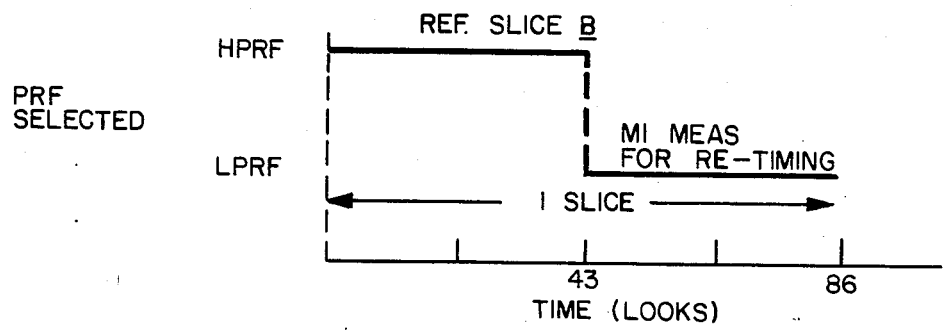

Examples of the reference slice PRF distributions are shown in FIGS. 4A and 4B. Two possible distributions have been selected. If no MI has been detected in both previous slices, the choice of reference slice A (FIG. 4A) or B (FIG. 4B) is determined by a pseudorandom sequence. (See the decision matrix shown in FIG. 2). If the number of looks containing MI exceeds the maximum number ($\geq 9$), then the selection of reference slice A or B is based on look 86 of the previous slice. The PRF of look 86 (previous slice) is normally the same as the PRF of the first 43 looks of the reference slice, (e.g. if look 86 (previous slice)=LPRF, then A is selected) unless the MI count is not reduced which inverts the PRF distribution for that condition. This approach reduces the time required to achieve PRF re-timing for certain relative slice timing conditions where more than one re-timing cycle is required to reduce the MI to an acceptable level.

The PRF re-timing algorithm uses the MI detection data during the reference slice. The algorithm functions are shown in FIG. 5. The algorithm utilizes MI detections in the LPRF mode only although this decision is arbitrary. The look numbers of the MI detections (LPRF only) are summed and averaged to determine the look centroid of the MI detections. Then, depending on whether the LPRF in the reference slice occurs during the first 43 or last 43 looks, the centroid is used directly to determine the PRF distribution within the 86 looks for the next two slices (minimum). For many situations, only one re-timing cycle is required. That is, the new PRF distribution reduces the MI to an acceptable level for the next two slices and no further re-timing is required. However, if this is not the case, the PRF is re-timed during the next opportunity (3 slices for center MI or 6 slices for left, right MI-2 antenna bomber case). The algorithm is based on the most likely case of 2 radars interfering and each one independently and automatically adjusting their PRF distributions to minimize the MI condition.

Figure 6A:
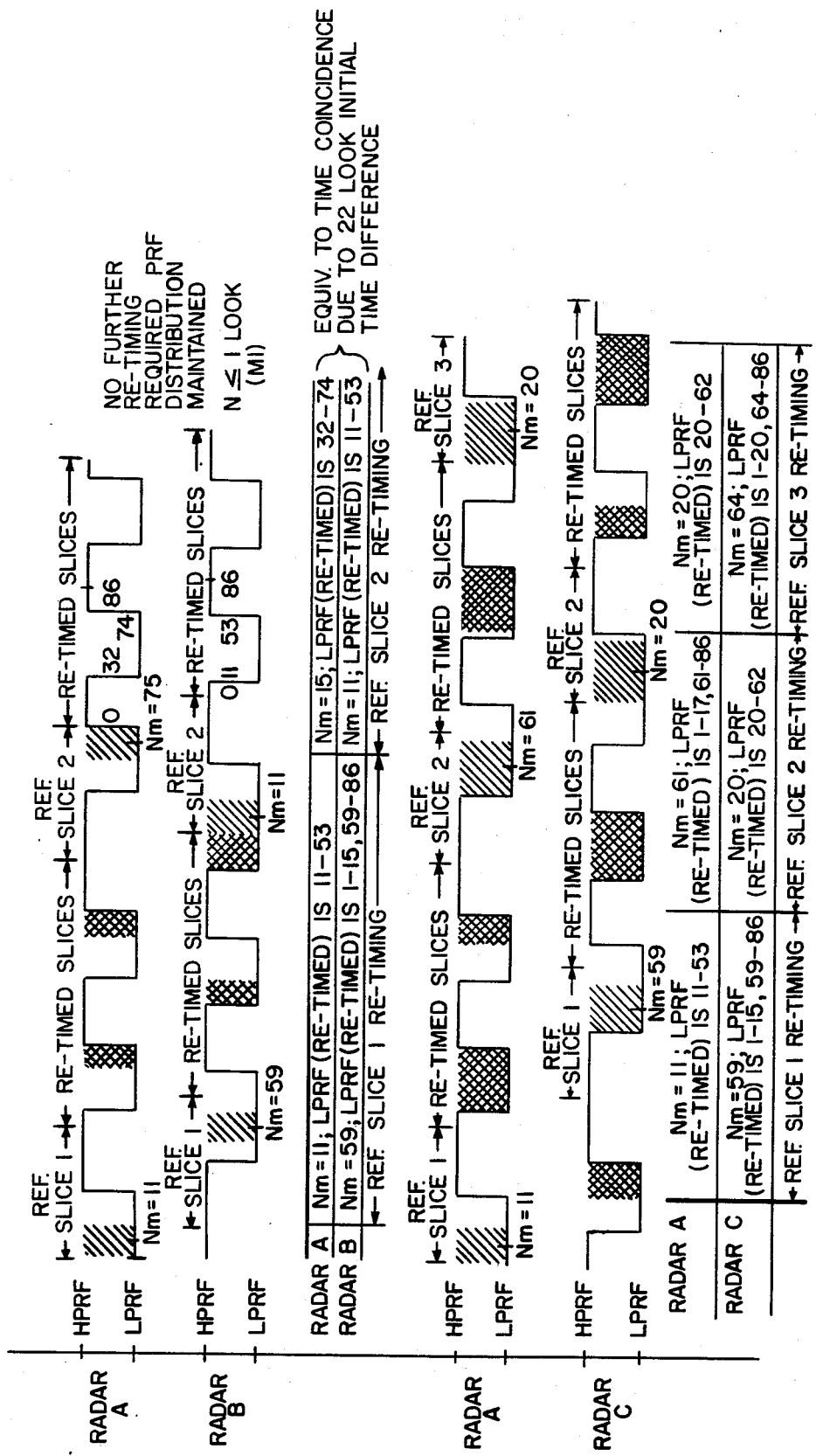
FIG. 6 comprises four waveforms depicting examples of the retiming of the PRF in the present invention for the preferred embodiment.
Figure 6B:
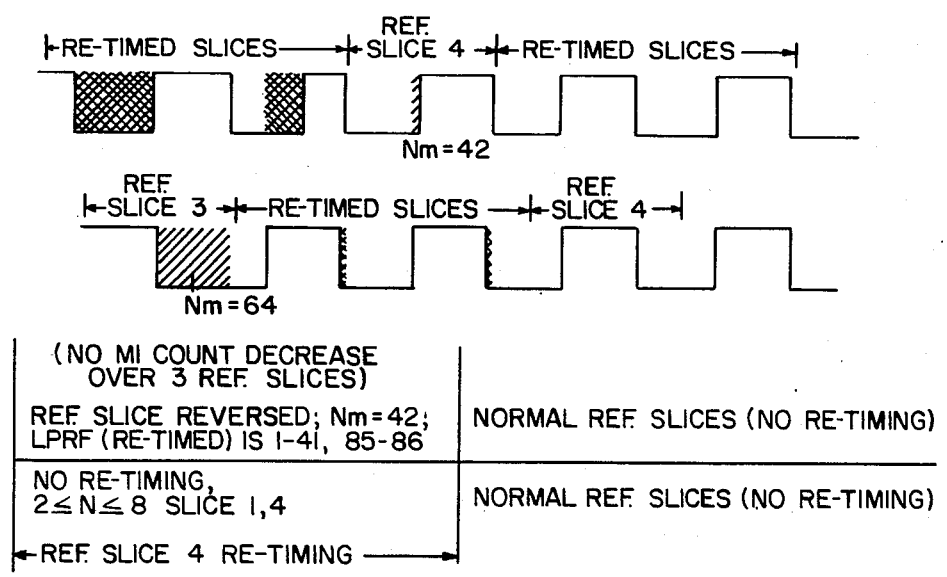

The technique is illustrated in FIG. 6 for a 2 radar case although the approach works with 3 or more interfering radars. The re-timing algorithm operation is illustrated for two different timing conditions. In the first example, involving radars A and B, the re-timing operation is illustrated for the condition where the relative timing between the two radars is one quarter of a slice. That is, the reference slices of each radar occur within approximately 22 looks of each other. It is also assumed that the two interfering radars are located in trail so that the left and right slice interference levels are approximately the same (center MI). For the first case, the two radars are re-timed after 2 reference slices (approximately 1.0 seconds). Radar A during the first reference slice computes an MI centroid (LPRF) at look 11 and thus re-times the next two slices to transmit LPRF during looks 11–53. Radar B measures the MI centroid (LPRF) at look 59 and retimes its next two slices to have LPRF looks during looks 1 to 5 and 59 to 86. In both cases, each of the re-timed slices have 50% high PRF looks and 50% low PRF looks to maintain STAE rejection.

After two slices each radar measures sufficient MI during the next two slices (16 looks-A; 16 looks-B) to require a second reference slice. The first 43 looks of each radar are the same as look 86 of the previous slice for each radar. Radar A measures the MI at look centroid 75 while radar B measures the MI at look 11. The next result is that the next two slices have the same PRF distribution (to within 1 look) and no further re-timing is required.

In the second example, radars A and C have a relative reference slice timing of 1½ slices or 139 looks. For the conditions shown, re-timing (to within 8 looks) takes 3 reference slices (for radar A) or 2.25 seconds. The calculations of the re-timing algorithm are shown below the PRF-time distributions in the same manner as for the first example (radars A and B).

C. Determination of CO-PRF Blanking Algorithm for Non-zero Closing Rate

The opposite (or different) PRF MI detection blanking logic data are used for determining PRF re-timing. The blanking of non CO-PRF MI is achieved based on the unique frequency/time spectra of opposite PRF MI data and such blanking logic is always needed for an MI environment When blanking occurs, the looks blanked in a reference PRF (LPRF) are stored and used to compute the MI look centroid used for re-timing during the reference slice. The total number of looks (LPRF) blanked by MI detection are also stored during the non-reference slice times to determine (see FIG. 3) the need for any re-timing during the reference slice.

The updating or additional re-timing cycles required to reduce MI to an acceptable level has been discussed previously and FIG. 3 describes the conditions for re-timing. Since the single antenna (fighter), scans the entire angular coverage volume with one antenna beam, the re-timing conditions are slightly different than for two antennas (bomber). In general, single antenna MI is reduced to a tolerable level in approximately one half the time required for the two antenna cases.

Even when two radars are operating CO-PRF, interference can still cause target false alarms. However for the normal formation conditions of zero closing rate, the long term stability requirement of the radar could prevent the interference from occurring at target doppler filters due to the single frequency spectra of CO-PRF MI being below the minimum doppler frequency (nominally zero doppler). This will not always be the case (e.g. when two aircraft are approaching formation) and thus some means must be used to blank the target filters affected when the two (or more) MI radars are not at a zero closing rate. To accomplish this, the MI data blanker information is used to determine the appropriate filters to blank.

Figure 7:
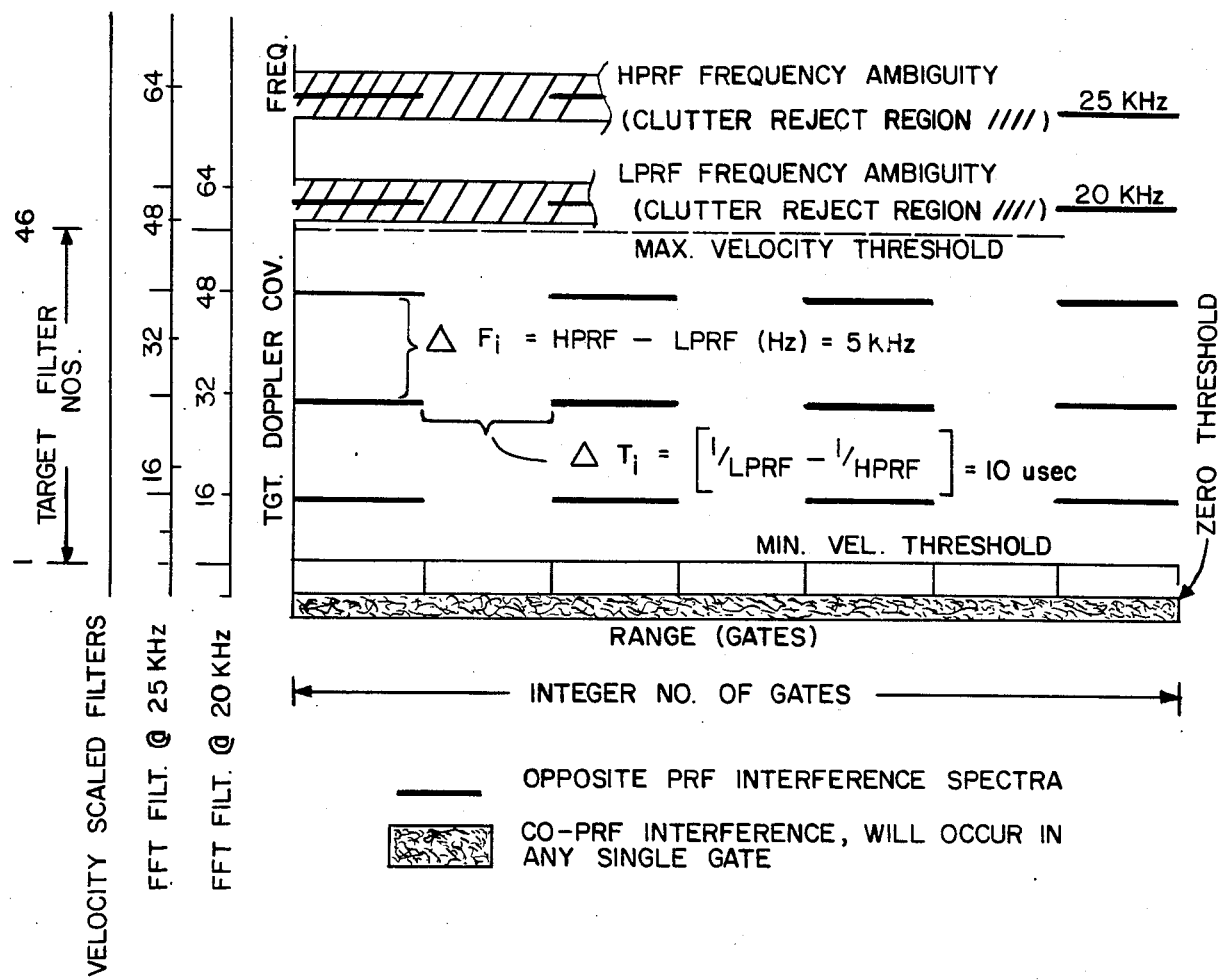
FIG. 7 is a table of the CO-PRF blanking in the present invention for the preferred embodiment.

The blanking algorithm is illustrated in FIG. 7. Since the non CO-PRF MI represents data from two radars at different PRF's, the first filter(s) blanked could occur at a PRF difference frequency of 5 KHz (for radars at 25 and 20 KHz PRF's for example). Blanking also occurs at multiples of this frequency. The frequency difference of 5 KHz is with respect to the CO-PRF frequency difference ($\Delta F_o$). For the case of zero closing rate and negligible long term frequency drift, ($\Delta F_o$=zero), the CO-PRF MI will not fall in the target doppler filters and thus will not be detected or cause a false target detection (false alarm).

For a positive closing rate, the CO-PRF interference will occur at an apparent closing doppler corresponding to one-half of the actual closing rate plus or minus the long term drift. To eliminate false alarms, the CO-PRF filter blanking will cause blanking of all filters of all gates at frequencies 5 KHz (for the two PRF example of 25 KHz and 20 KHz) below MI data clump detected when opposite PRF MI data is measured. The resulting filters will be out-of-band for zero closing rate conditions and will not affect detection sensitivity. The CO-PRF data blanking calculation is updated whenever the opposite (or different) PRF MI blanking occurs. When opposite PRF MI blanking occurs, the CO-PRF filter blanker is enabled for the next two slices (172 looks). This means that the CO-PRF filter blanking will occur for 2 slices (all looks) if only 1 look contains MI during those two slices. This insures that under the best MI conditions (1 look), the appropriate CO-PRF blanking occurs.

The CO-PRF blanking calculation may be implemented on a velocity scaled filter number (scaled to equivalent filter number for same taraget doppler) to insure that the appropriate filters are blanked independent of PRF. For example, the first MI line could occur at an offset of 16 velocity scaled filters (5 KHz/20 KHz×64 filters=16) relative to the CO PRF MI (zero closing velocity case). Thus if the MI is detected at velocity scaled filter number 11, the CO-PRF MI filter blanked would be −5. (This may be below the target doppler coverage and thus no blanking is required). However if the two radars have MI and a relative closing rate equivalent to the minimum detectable velocity of the system, (for example opposite PRF detected at Filter 21) then the CO-MI filters will be 5±Δn (Δn corresponds to filters blanked due to variation in the long term stability). As the two radars approach each other at closing velocities exceeding the minimum target velocity of the system, then the CO-PRF filters blanked will increase in velocity directly proportional to the closing rate of the two radars creating the MI problem.

Figure 8:
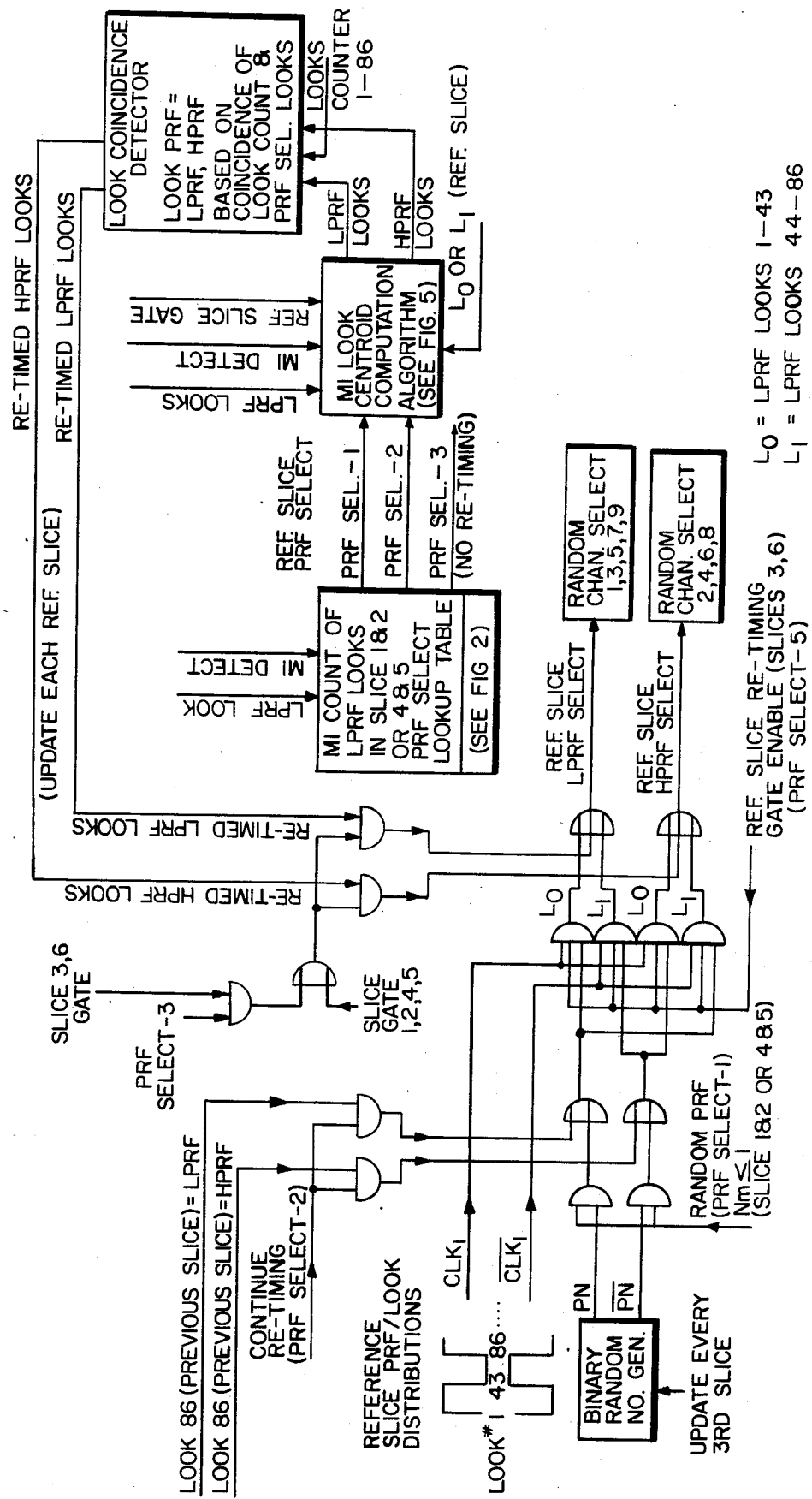
FIG. 8 is a functional block diagram of the present invention for the preferred embodiment.

In FIG. 8, all of the previously described functions required to implement the logic in a digital data signal processor of a radar system are shown. Some of these changes will involve hardware depending on the processor control architecture in addition to firmware changes. Since the PRF distribution in any slice will be variable in the new implementation, the specific looks to be added for post detection integration for any single PRF integration of detections will be under control of the PRF slice distribution function rather than being fixed. All MI blanking will be performed on a look basis. All target detection and display functions can be maintained as previously designed (for no MI requirement) since the false alarms are controlled on a look basis for MI data blanking and system sensitivity loss is controlled on a slice basis by the adaptive PRF functions previously described.

The system sensitivity effects of MI are described in the graph of FIG. 9, which shows the S/N loss versus the number of MI looks blanked. It can be seen that if MI is held to 8 looks or less the S/N loss will be maintained to within a tolerable level. It should be added, however, that when the two radars are the same RF or co-channel (<11% of the time for a nine channel pseudorandom RF agile radar), the MI interference level is a maximum, and the radar system must have sufficient dynamic range so as to avoid spectral spreading in the same manner as the requirement to prevent clutter spreading (linear processing). Thus just below A/D saturation, the system linearity specification must be maintained. If the MI exceeds analog to digital saturation then all of that look data will be blanked for the range gates affected. This condition, however, can occur independent of any MI suppression scheme and is a basic radar limitation.

Although the invention has been described with reference to a particular timing embodiment, it should be understood to those skilled in the art that the invention is capable of a variety of alternative embodiments within the spirit and scope of the appended claims.

What is claimed is:

1. A method for minimizing sensitivity loss due to blanking when mutual interference (MI) between two or more pulse doppler radars of the same design is detectable by each radar, comprising the steps of:
  (a) establishing a reference time period in which the time period includes a succession of coherent looks consisting of transmitted and received pulses at one PRF followed by the same number of coherent looks at a second PRF;
  (b) determining the looks containing opposite PRF mutual interference data by noting the look numbers when opposite PRF blanking is detected;
  (c) measuring the time centroids of the coherent looks containing MI;
  (d) utilizing the MI centroid to compute the timing of the PRF distribution during successive slices by using a table lookup algorithm;
  (e) establishing update rates for the re-timed PRF distributions and thresholds to determine when no PRF re-timing is required; and
  (f) utilizing opposite PRF blanking filter data to blank CO-PRF detections for non zero closing rate or reduced frequency stability conditions where CO-PRF data is detectable within the doppler filter frequency region.

* * * * *